(12) United States Patent
Al-Qabandi

(10) Patent No.: US 7,513,424 B2
(45) Date of Patent: Apr. 7, 2009

(54) DIGITAL SYSTEM AND METHOD FOR HOME ENTERTAINMENT

(76) Inventor: Jamal Al-Qabandi, Surra, Block 4, Street 2, House 26, Kuwait City (KW)

( * ) Notice: Subject to any disclaimer, the term of this patent is extended or adjusted under 35 U.S.C. 154(b) by 119 days.

(21) Appl. No.: 11/348,328

(22) Filed: Feb. 7, 2006

(65) Prior Publication Data

US 2007/0181677 A1 Aug. 9, 2007

(51) Int. Cl.
*G06K 15/00* (2006.01)
*G06Q 99/00* (2006.01)

(52) U.S. Cl. .......................... 235/383; 705/52

(58) Field of Classification Search .............. 235/383; 705/14, 52; 725/30, 47, 78, 134
See application file for complete search history.

(56) References Cited

U.S. PATENT DOCUMENTS 6,334,216 B1 * 12/2001 Barth ................... 725/30
2002/0178452 A1 * 11/2002 Lecomte ................ 725/78
2004/0133923 A1 * 7/2004 Watson et al. ........... 725/134
2006/0010074 A1 * 1/2006 Zeitsiff et al. ........... 705/52
2006/0129458 A1 * 6/2006 Maggio ................. 705/14
2006/0143655 A1 * 6/2006 Ellis et al. .............. 725/47

* cited by examiner

*Primary Examiner*—Karl D Frech
*Assistant Examiner*—April A Taylor
(74) *Attorney, Agent, or Firm*—Lowe Hauptman Ham & Berner, LLP

(57) ABSTRACT

A digital system for home entertainment includes a multi-function DVD Receiver and a remote large capacity digital library of multi-national materials. The system also includes a high speed connection between the multi-function DVD Receiver and the remote library. The system also includes a security sub-system including a smart card and smart card reader for gaining access to the library. Further, the system includes a point rating pricing system and an accounting sub-system so that items provided to a viewer are stored in the library for additional viewing without additional charge. A method for providing home entertainment is also disclosed.

2 Claims, 3 Drawing Sheets

DIGITAL SYSTEM AND METHOD FOR HOME ENTERTAINMENT

FIELD OF THE INVENTION

This invention relates to a digital system and method for home entertainment and more particularly to a system and method for purchasing viewing rights to a broad spectrum of worldwide materials.

BACKGROUND FOR THE INVENTION

Systems and methods for securing electronic delivery of motion pictures in digital format and the use of smart cards to control access to rented computer files are known. For example, a U.S. patent of Rabowski, U.S. Pat. No. 6,141,530 discloses a system and method for digital electronic cinema delivery. The system includes a base band processing system which receives analog cinema film as input, a storage system which receives digitized cinema files from the base band processing system and a radio frequency transmission system which communicates cinema and data files to and from various users as a radio frequency bit stream. The Rabowski system also includes a management system which controls transmission and storage of cinema and data files while a theatre system includes transmission line interfaces at theatres designated to receive films from the head end system. A receiver-decoder receives the bit stream and produces decoded cinema and data files at a base band. The system also includes a storage playback system which stores files until needed, secure projector system, and automation scheduling system which directs playback and a reverse channel which provides data back to the head end system from the theatres.

A U.S. patent of Mooney et al., U.S. Pat. No. 6,351,813 discloses an access control/crypto system having a smart card reader and an access control program for requesting information from a user to determine if a user is authorized to access the computer. The access control/crypto system uses encryption and smart card technology as a means for securing files in the system, telecommunicated globally or archived to a chosen media. The system includes an access hierarchy combined with the issuance of smart cards to control the various levels of access provided by the system.

Notwithstanding the above, it is presently believed that there is a need for and a potential commercial market for a new digital system and method for providing home video and audio entertainment. There should be a demand since such systems and methods deliver entertainment materials to clients in a form that matches today's technologies. Further, such systems provide such entertainment using conventional components.

Advantageously, the systems and methods in accordance with the present invention rely on the DVD format to be the structure of the stored video materials. Such structure is ready to use and provides high quality for both audio and video entertainment. Further, the structure can be modified programmatically as for example to add more subtitles, soundtracks or to add and/or edit information. The system and method is also applicable for use with superior sound systems and "Home Theatre" and provides subscribers with the same unique functions of a DVD player.

In addition to the above, the systems and methods in accordance with the present invention will provide movies, TV series, programs, drama, orchestral works, musical compositions, opera, documentaries, educational programs, animated cartoons, video games etc. from worldwide sources and facilitate payment by using a "point rating method."

Further advantages of the present invention is a provision for full downloading of selected items which eliminate net streaming, full payment of any copyright royalties and elimination of copyright infringement as well as free storage of the purchased items without any need to copy the selected items or to maintain a supply of DVD discs.

BRIEF SUMMARY OF THE INVENTION

In essence, the present invention contemplates a digital home and entertainment system and method. The system comprises a multi-function DVD receiver, a remote large capacity digital library and a high-speed connection linking the multi-function DVD receiver and the remote library. The system also includes a security subsystem associated with the library to limit access to the library to subscribers. The security system includes a smart card containing subscription data and a smart card reader for granting access to the library when the information on the card matches information in the security system. A browser is also provided for browsing the contents of the library and for selecting items for viewing on the receiver. In one embodiment of the invention, the items are provided in read-only uncopyable format. The system also includes means for paying for the selected items and means for maintaining the selected items in the library for further viewing by the same subscriber without further payment.

A second embodiment of the invention contemplates a method for providing home entertainment. The method includes the steps of establishing a remote large capacity digital library and making items in the library available for purchase by subscribers over a high-speed link or connection. The method also includes the step of providing a security system including a smart card and a smart card reader for gaining access to the library. In addition to the above, the method includes the step of browsing the contents of a library and selecting items to be purchased from the library. Then after making payment for the selected items, the items are displayed for viewing preferably in read-only format and in uncopyable form. An important aspect of the invention resides in maintaining the selected items in the library and making the previously paid for items available to the subscriber without any further charge.

The invention will now be described in connection with the accompanying figures.

DESCRIPTION OF THE PREFERRED EMBODIMENTS OF THE INVENTION

Figure 1:
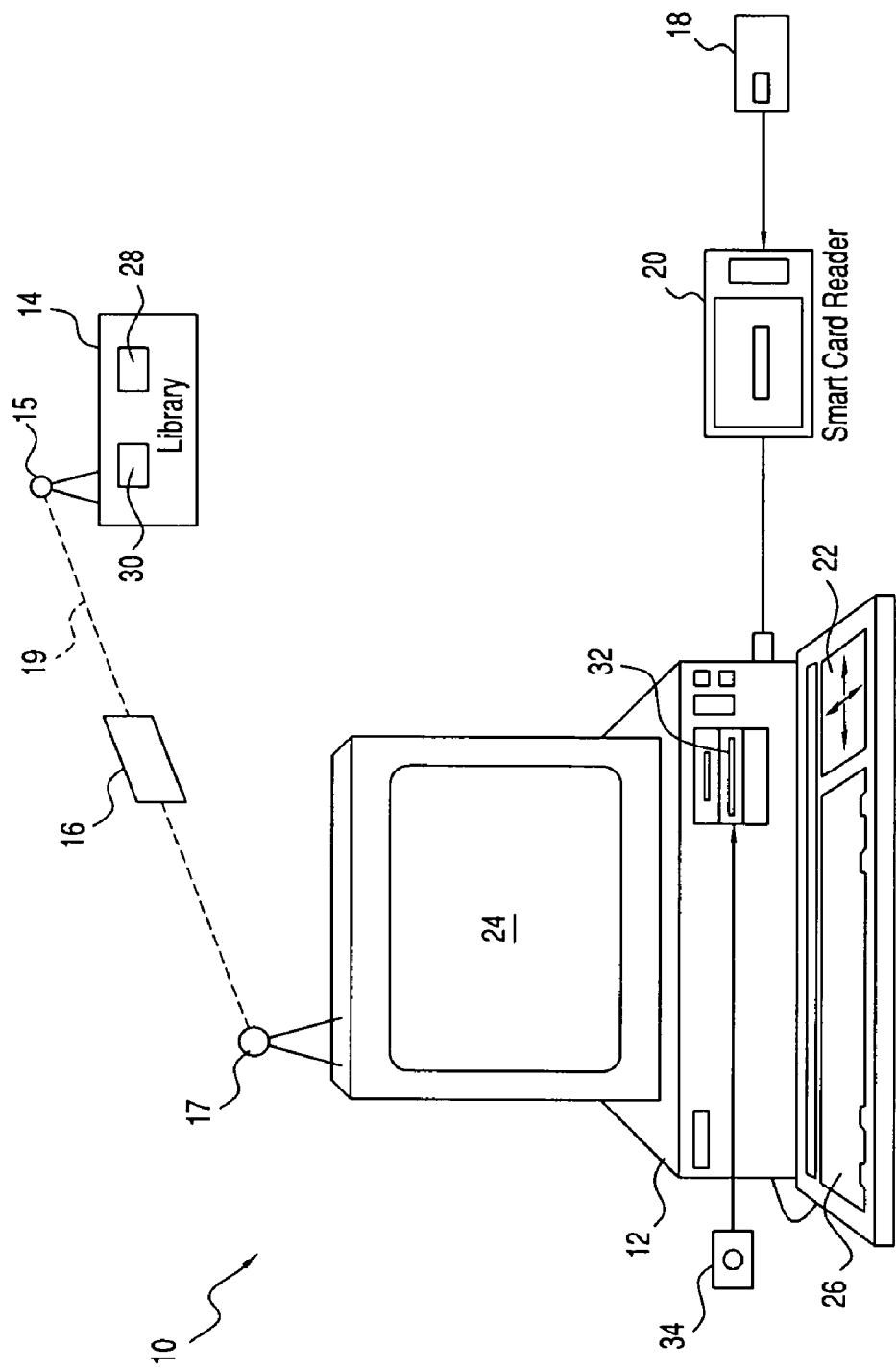
FIG. 1 is a schematic illustration of a first embodiment of the invention.

A digital home entertainment system in accordance with the present invention is illustrated in FIG. 1. As illustrated, the system 10 includes a multi-function DVD receiver 12, which is shown as being combined with or incorporated in a computer. The system also includes a remote large capacity digital library 14, which is a source for movies, documentaries, educational programs, video games etc. from worldwide sources. A high-speed connection 16 provides wireless connection between the multi-function receiver 12 and the digital library 14. Wireless transmission may be by any conventional means such as a pair of tower-mounted transceivers 15 and 17 or by cable and may incorporate GSM, 3GSM or EDGE networks. Such transmissions may be made over a secure line 19. The costs for acquiring items are preferably provided on a points ratio system 30 as will be described in more detail with respect to a further embodiment of the invention.

Access to the library 14 is limited as for example by a security system. The security system may be of the type disclosed in a U.S. patent of Mooney et al., U.S. Pat. No. 6,351,813 which is incorporated herein in its entirety by reference. Other conventional security systems may also be used. As shown, access to the digital library 14 is obtained by a smart card 18 inserted into a smart card reader 20. A keyboard activated browser 22 provides access to and/or means for viewing the contents of the library 14 and for selecting items or reviewing portions thereof such as a preview on a video screen 24 of the multi-function receiver 12. The selected items may be purchased using means such as a keypad 26. An important feature of the present invention resides in means 28 in the library 14 for maintaining selected items for future viewing by the subscriber who purchased the item without further costs.

In practice, the purchased item is received by the multi-function DVD receiver in a read-only copy protected format since the purchaser only buys the rights to view the material. This is important for copyrighted material and prevents the material from being copied and distributed to others. Nevertheless, the purchaser reserves the right to review the material in the future without further payment. Therefore, the library 14 includes means 30 an accounting program. The accounting program keeps track of the purchases by each subscriber. Then when a subscriber orders one or more items for viewing and/or purchase, the accounting program reviews their previous purchases and deducts the costs for previously purchased items from the bill.

The system in accordance with the first embodiment of the invention may also included a memory card reader for insertion of a memory card 34. The memory card reader 34 is programmed to allow a purchased item to be downloaded onto the memory card but viewed only when used in combination with the same smart card 18 that was used in purchasing the item. These memory cards provide limited storage of items for use in the event that there is a technical problem in maintaining a connection with the library 14.

Figure 2:
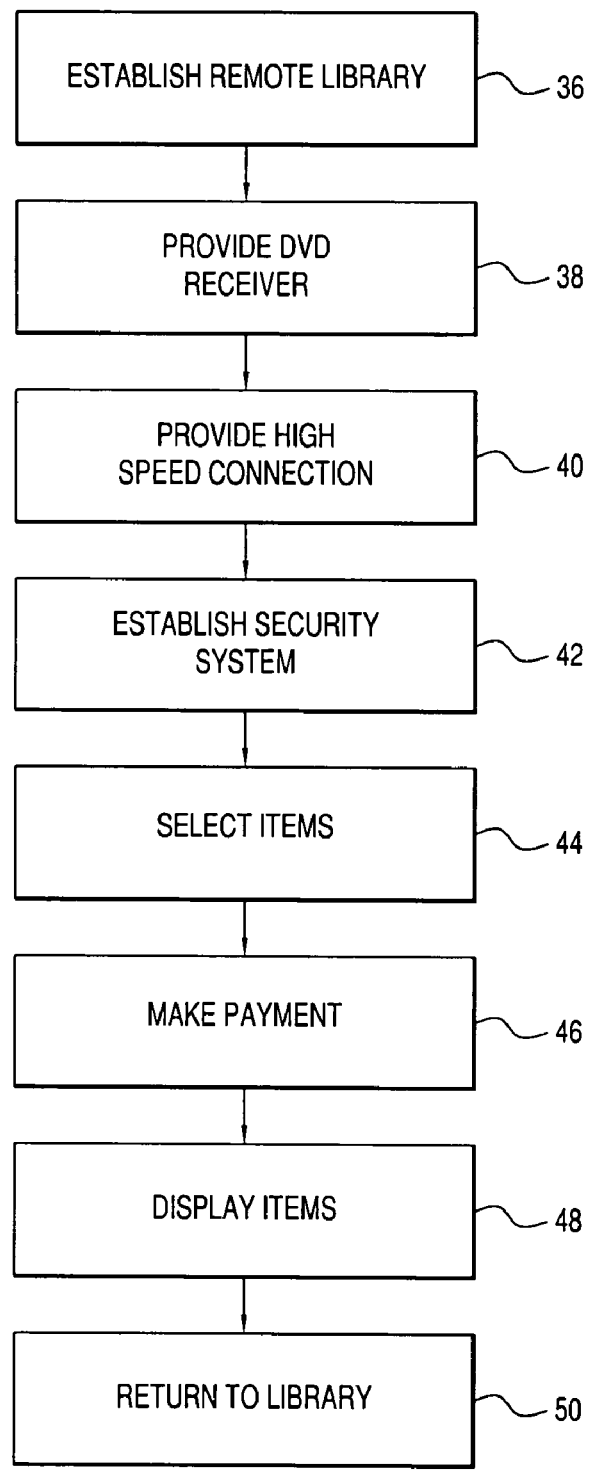
FIG. 2 is a flow diagram illustrating a method in accordance with a second embodiment of the invention; and, FIG. 3 is a flow diagram which illustrates a method in accordance with a third embodiment of the invention.

A method for providing home entertainment in accordance with a second embodiment of the invention is illustrated in FIG. 2. As illustrated, the method for providing home entertainment includes the step 36 of establishing a remote large capacity digital library for containing motion pictures, documentaries, TV series, programs, drama, orchestral works, musical compositions, opera, educational programs, cartoons, pre-recorded sporting events, video games and the like. Such items are drawn from worldwide sources and may at times be available in select languages. Viewing rights to such items are then made available for purchase by subscribers.

The method also includes the step 38 of providing a multi-function DVD receiver and a step 40 of providing a high-speed connection for connecting the multi-function DVD receiver to the digital library to allow subscribers to purchase selected items. An important aspect of the present invention resides in the step 42 of establishing a security system as for example the use of smart card 18 and smart card reader 20 (FIG. 1) for gaining access to the library.

The multi-function receiver provided in step 38 is connected to the remote digital library in step 40. However, in order to limit access to the remote digital libraries to a subscriber or member, a security system is established and implemented in step 42. The security system may for example include a smart card and smart card reader for obtaining access to the digital library and identifying the subscriber for accounting and billing purposes. Then a subscriber browses an index of programs, selects items for reviewing in step 44 and makes payment in step 46. Payment may be made in any conventional manner as for example by deduction from a pre-existing credit account, billed to the subscriber, by credit or debit card or other conventional manner. After making payment, the subscriber displays the selected items on a DVD Receiver in step 48. Then after viewing the selected items in a read only non-copyable format, the items are returned to the library and held for future use by the same subscriber without additional payment in step 50.

Figure 3:
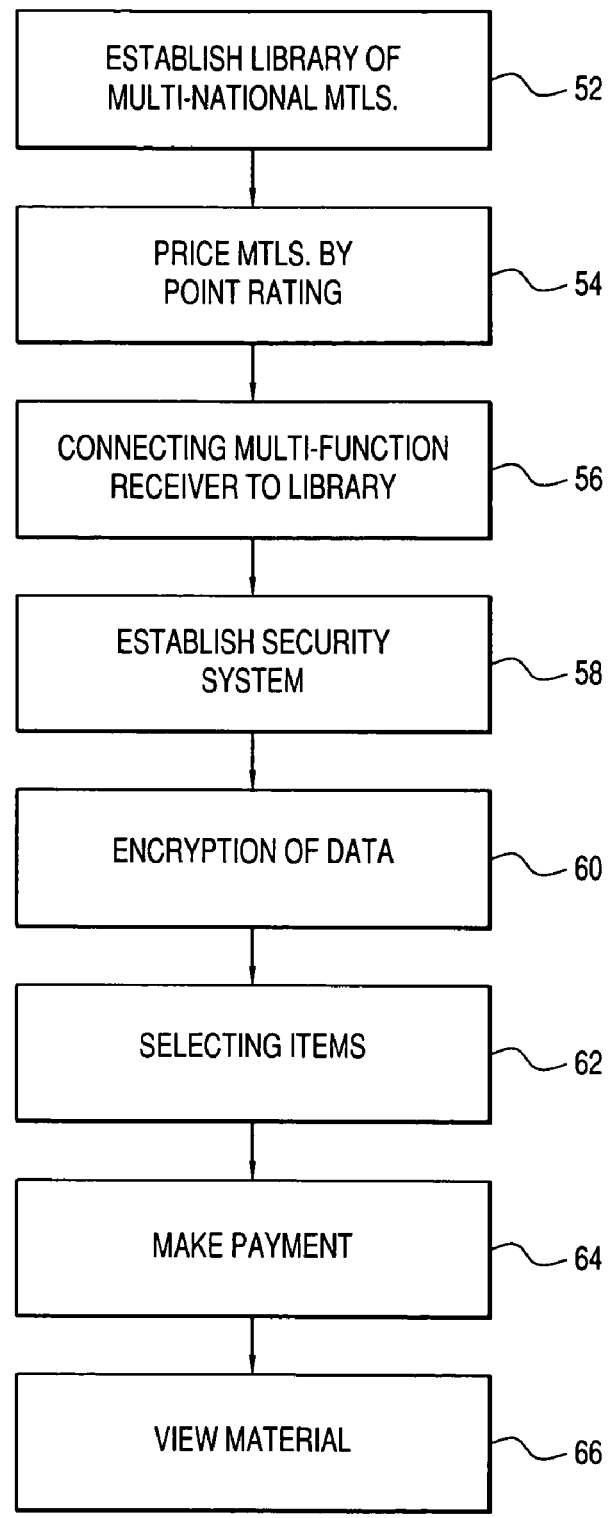

A third embodiment of the invention contemplates a method for providing home entertainment as illustrated in FIG. 3. The third embodiment of the invention is similar to the second embodiment, but includes several additional steps. To be more specific, a method for providing home entertainment includes the step 52 of establishing a remote digital library of multi-national materials. Such materials include movies, TV programs, theater performances etc. which are produced in various countries world wide.

An important feature of the third embodiment of the invention resides in pricing by a point rating system in step 54. The point rating system eliminates a need for providing prices for each item in multiple currencies. For example, a recent British film may be priced at 3 points while an American film could be priced at 2½ points and a Japanese film at 3½ points. Thus, the number of points for each item would not fluctuate with the currency exchange rate. In is also contemplated that subscribers could purchase points in advance and maintain a credit balance for the purchase of any material in any language. Then, for subscribers who do not or have not established a credit balance points could be purchased at the current rate of exchange. It is also contemplated that in those cases where material is available in various languages, the subscriber could select which language to use.

In this embodiment of the invention, a multi-function receiver is connected to the multi-national library in step 56 and a security system established in step 58. The security system is preferably based on a smart card and smart card reader in essentially the same manner as in the second embodiment of the invention. However, the third embodiment of the invention contemplates the use of a secure connection in step 60 which may be by an encryption of data or other security method to protect account information and for letting accessed material from being viewed and/or copied by non-subscribers. It is also contemplated that the multi-national material may be provided over a GSM, 3GSM or EDGE networks.

A subscriber uses his/her smart card and smart card reader to access the digital library and to browse an index which may be provided in various categories and select those items that they would like to purchase in step 62. The purchase of items is limited to viewing rights without the right to make copies. Payment is then made in step 64 and the material viewed in step 66.

As in the second embodiment of the invention, the purchase price is for viewing rights only and does not permit copying of the material. This allows for proper payment to the copyright owners and prevents copyright infringement. Further, the material can be stored on a memory card which temporarily stores this information to avoid potential problems attributed to net streaming such as loss of power or the like. The memory card may be limited for use within a limited period of time. In addition, the storage process for providing subsequent viewing overcomes the necessity of home storage of multiple disc or cassettes since the material is available immediately from the digital library without further charge.

While the invention has been described in connection with the accompanying drawings, it should be recognized that changes and modifications may be made therein without departing from the scope of the appended claims.

What is claimed is:

1. A method for providing home entertainment comprising the steps of:

establishing a remote large capacity digital library containing a world wide selection of videos, audios and video game materials and abstracts thereof with multi-language capability for reviewing abstracts and making items in the library available for purchase by subscribers over a high-speed link;

establishing a security system including a smart card for gaining access to the library;

providing a multi-functional DVD receiver that allows a subscriber to connect to the digital library, browse the contents of the library and search specific materials, purchase desired materials, download the purchased materials and playback the downloaded material on the DVD receiver;

browsing and selecting items to be purchased from the library wherein the browsing step includes a free preview of items being considered for purchase;

listing selected items and costs calculated after deduction of previously purchased items and wherein a points rating system is used for pricing and payment;

making payments for the selected items;

downloading a selected item to a hard disc to avoid net streaming;

displaying the selected items on the multi-function DVD receiver in read-only format;

providing a memory card slot and a memory card for storing purchased items and wherein the memory card is usable only in combination with the smart card used in purchasing materials;

in which the high-speed link is a secure line; and maintaining the selected items in the library for future viewing by the same subscriber without further payment.

2. A method for providing home entertainment according to claim 1, in which the high-speed link incorporates a GSM, 3GSM or EDGE network.

* * * * *